US006627029B1

(12) United States Patent
Müller et al.

(10) Patent No.: US 6,627,029 B1
(45) Date of Patent: Sep. 30, 2003

(54) PRODUCTION OF A THREE-DIMENSIONAL MOLDING

(75) Inventors: Klaus Müller, Sulzbach (DE); Klaus Klemm, Oberelsbach (DE)

(73) Assignee: Basell Polyolefine GmbH, Wesseling (DE)

( * ) Notice: Subject to any disclaimer, the term of this patent is extended or adjusted under 35 U.S.C. 154(b) by 114 days.

(21) Appl. No.: 09/592,848

(22) Filed: Jun. 13, 2000

(30) Foreign Application Priority Data

Jun. 16, 1999 (DE) .......................................... 199 27 346

(51) Int. Cl.⁷ ............................................... B32B 31/00
(52) U.S. Cl. ....................... 156/245; 156/242; 156/212; 156/214
(58) Field of Search ............................. 264/176.1, 241, 264/513; 156/212, 214, 242, 245, 229

(56) References Cited

U.S. PATENT DOCUMENTS

| 3,446,686 A | * | 5/1969 | Butler et al. ................ 156/229 |
| 4,101,698 A | | 7/1978 | Dunning et al. ............... 428/31 |
| 4,369,157 A | * | 1/1983 | Conner ........................ 264/246 |
| 4,871,612 A | * | 10/1989 | Okina et al. .............. 428/304.4 |
| 4,890,795 A | * | 1/1990 | Da Re' ........................... 241/3 |
| 4,902,557 A | * | 2/1990 | Rohrbacher ............... 264/176.1 |
| 5,342,666 A | * | 8/1994 | Ellison et al. ............... 428/174 |
| 5,707,697 A | * | 1/1998 | Spain et al. ................. 428/208 |
| 5,763,050 A | | 6/1998 | Hirmer ........................ 428/174 |
| 5,912,081 A | | 6/1999 | Negele et al. ............... 428/423 |

FOREIGN PATENT DOCUMENTS

| DE | 2 009 819 | | 9/1971 |
| DE | 197 22 339 A1 | | 12/1998 |
| DE | 198 58 173 A1 | | 6/2000 |
| EP | 0 419 001 A1 | | 3/1991 |
| EP | 0 819 516 A2 | | 1/1998 |
| EP | 0 852 187 A1 | | 7/1998 |
| EP | 0 995 571 A1 | | 4/2000 |
| FR | 2 673 575 | | 9/1992 |
| GB | 1 167 403 | | 10/1969 |
| GB | 1170977 A | * | 11/1969 |

* cited by examiner

Primary Examiner—Jeff H. Aftergut
(74) Attorney, Agent, or Firm—Keil & Weinkauf

(57) ABSTRACT

A process for producing a three-dimensional molding made from a layered composite material comprising a thermoplastic polymer backing, an intermediate layer arranged thereupon and a heat-cured layer applied to the intermediate layer comprises bonding the intermediate layer and the heat-cured layer applied thereto to the backing by heat treatment in a molding system and also giving these a three-dimensional shape prior to or during the heat treatment in the molding system

14 Claims, No Drawings

PRODUCTION OF A THREE-DIMENSIONAL MOLDING

The present invention relates to a process for producing a three-dimensional molding from a layered composite material comprising a thermoplastic polymer backing, an intermediate layer arranged thereupon and a heat-cured layer applied to the intermediate layer.

The layered composite materials known hitherto are used in particular in the furniture industry and in the household equipment industry and essentially consist of a backing layer made from wood or from wood fibres or from individual sheets of paper press-molded with additional resin, to which decorative layers, and also other heat-cured layers, known as overlays, are applied using heat and pressure. The decorative layers used here frequently have a woodgrain, metallic or marble pattern. In many cases the decorative layers are used together with the heat-cured layers applied thereto, in the form of laminates.

However, a disadvantage of layered composite materials of this type is that they are to some extent susceptible to moisture penetrating into the core layer from the edges, since both wood and wood fibres, and also individual sheets of paper, tend to swell when exposed to moisture. In addition, layered composite materials of this type are relatively difficult to shape.

For a wide variety of industrial applications, for example in the automotive and electrical industries, there is a need for surface materials which firstly have compressive strength and are scratch resistant and secondly have comparatively high heat resistance, and which moreover can readily be produced with decorative effects.

Surface materials used for a long time in furniture production have two or more layers, including a backing layer, a decorative layer and a heat-cured layer applied thereto. These layers, with the aid of other bonded layers, for example made from paper or from adhesive films, give a decorative layered composite material. However, a layered composite material of this type is very complicated to produce, frequently has a high formaldehyde content, and has disadvantageous swelling behavior.

DE-A 1 97 22 339 discloses a layered composite material which comprises a backing layer made from polypropylene, a decorative layer arranged thereupon and a heat-cured layer applied to the decorative layer. The earlier application DE-A 19 858 173 moreover describes a layered composite material made from a backing layer of various other thermoplastic polymers, for example certain styrene copolymers or polyoxymethylene or, respectively, polybutylene terephthalate, and also a decorative layer applied thereto and a heat-cured layer lying thereupon. Examples of features of layered composite materials of this type with a backing layer made from thermoplastic polymers are, when compared with conventional layered composite materials with backing layers made from wood, wood fibers or paper: high heat and moisture-resistance, better mechanical strength and easier processing. However, a degree of stiffness and brittleness in the individual polymeric layers means that the layered composite materials known from DE-A 19 722 339 and DE-A 19 858 173 still have certain disadvantages in processing and shaping, in particular in three-dimensional shaping to give components for the automotive sector, the household sector or the electrical sector, especially when three-dimensional moldings are being produced. For three-dimensional shaping, high flexibility and easy processability of the molding are particularly important.

It is an object of the present invention to overcome the disadvantages described and develop a process which produces a three-dimensional molding from a layered composite material, is simple to carry out, gives moldings with any desired design and can be carried out without excessive use of resources in a cost-effective manner in conventional molding systems. A further object is that the novel process should also allow the production of three-dimensional moldings which are not susceptible to chemically, mechanically or thermally induced damage and have high scratch resistance and compressive strength.

We have found that this object is achieved by developing a new process to produce a three-dimensional molding from a layered composite material. The layered composite material here has a thermoplastic polymer backing, an intermediate layer arranged thereupon and a heat-cured layer applied to the intermediate layer, and the process comprises bonding the intermediate layer and the heat-cured layer applied thereto to the backing by heat treatment in a molding system and also giving these a three-dimensional shape prior to or during the heat treatment in the molding system.

In the layered composite material produced by the novel process it is also possible for both sides of the backing made from the thermoplastic polymer to have an intermediate layer arranged thereupon and a heat-cured layer applied to the intermediate layer, giving a sandwich structure with the backing in the middle.

There is also a modification of the novel process in which the layered composite material also has, between the intermediate layer and the heat-cured layer, a decorative layer which has been arranged upon the intermediate layer and which, together with the intermediate layer and the heat-cured layer, is bonded to the backing by heat treatment in a molding system and moreover is given a three-dimensional shape prior to or during heat treatment in the molding system.

Based on the total weight of the backing, the material of the backing may comprise from 1 to 60% by weight, preferably from 5 to 50% by weight, particularly preferably from 10 to 40% by weight, of reinforcing fillers, such as barium sulfate, magnesium hydroxide or talc with an average particle size of from 0.1 to 10 $\mu$m, measured to DIN 66 115, wood, flax, chalk, glass fibers, coated glass fibers, long or short glass fibers, glass beads or mixtures of these. The material of the backing may also comprise the usual additives, such as stabilisers to protect against the action of light, UV radiation or heat, pigments, carbon blacks, lubricants, flame retardants, blowing agents and the like, in the amounts which are usual and required.

Examples of thermoplastic polymers which may form the backing are polypropylene, polyethylene, polyvinylchloride, polysulfones, polyetherketones, polyesters, polycycloolefins, polyacrylates and polymethacrylates, polyamides, polycarbonate, polyurethane, polyacetals, such as polyoxymethylene, polybutylene terephthalates and polystyrenes. Both homopolymers and copolymers of these thermoplastic polymers may be used here. The backing preferably also comprises, besides the reinforcing fillers, polypropylene, polyoxymethylene, polybutylene terephthalate or polystyrene, in particular styrene copolymers with subordinate proportions of one or more comonomers, such as butadiene, $\alpha$-methylstyrene, acrylonitrile, vinylcarbazole, or else esters of acrylic, methacrylic or itaconic acid. The backing used in the novel process may also comprise recycled materials made from these thermoplastic polymers.

For the purposes of the present invention, polyoxymethylenes are homo- or copolymers of aldehydes, for example of formaldehyde, or of cyclic acetals, containing recurring carbon-oxygen bonds in their molecule and having a melt flow rate (MFR) to ISO 1133 of from 5 to 40 g/10 min, in particular from 5 to 30 g/10 min, at 230° C. with a load of 2.16 kg.

The polybutylene terephthalate preferably used is a higher-molecular-weight esterification product of terephthalic acid and butylene glycol with a melt flow rate (MFR) to ISO 1133 of from 5 to 50 g/10 min., in particular from 5 to 30 g/10 min, at 230° C. with a load of 2.16 kg.

Possible styrene copolymers are in particular copolymers having up to 45% by weight, preferably up to 20% by weight, of copolymerized acrylonitrile. Copolymers of this type made from styrene and acrylonitrile (SAN) have a melt flow rate (MFR) to ISO 1133 of from 1 to 25 g/10 min, in particular from 4 to 20 g/10 min, at 230° C. with a load of 2.16 kg.

Other styrene copolymers whose use is likewise preferred contain up to 35% by weight, in particular up to 20% by weight, of copolymerized acrylonitrile and up to 35% by weight, in particular up to 30% by weight, of copolymerized butadiene. The melt flow rate of copolymers of this type made from styrene, acrylonitrile and butadiene (ABS) to ISO 1133 is from 1 to 40 g/10 min, in particular from 2 to 30 g/10 min, at 230° C. with a load of 2.16 kg.

Other materials used for the backing are in particular polyolefins, such as polyethylene or polypropylene, preferably the latter. For the purposes of the present invention, polypropylenes are homo- or copolymers of propylene. Copolymers of propylene contain subordinate amounts of monomers copolymerizable with propylene, for example $C_2$–$C_8$-1-alkenes, such as ethylene, 1-butene, 1-pentene or 1-hexene. It is also possible to use two or more different comonomers.

Examples of particularly suitable backings are propylene homopolymers or propylene copolymers having up to 50% by weight of other copolymerized 1-alkenes having up to 8 carbon atoms. The propylene copolymers here are random copolymers or block or impact copolymers. If the propylene copolymers have a random structure they generally contain up to 15% by weight, preferably up to 6% by weight, of other 1-alkenes having up to 8 carbon atoms, in particular ethylene, 1-butene or a mixture of ethylene and 1-butene.

Block or impact copolymers of propylene are polymers resulting from a two-stage preparation in which a propylene thermopolymer or a random propylene copolymer having up to 15% by weight, preferably up to 6% by weight, of other 1-alkenes having up to 8 carbon atoms is first prepared. Onto this is then polymerized a propylene-ethylene copolymer with an ethylene content of from 50 to 80% by weight. The propylene-ethylene copolymer may also contain other $C_4$–$C_8$-1-alkenes. The amount of the propylene-ethylene copolymer polymerized on generally gives the final product a content of from 3 to 60% by weight of the copolymer produced in the second stage.

The polymerization to prepare polypropylene may use a Ziegler-Natta catalyst system. Catalyst systems of this type used here are in particular those which have, in addition to a titanium-containing solid component a), cocatalysts in the form of organic aluminum compounds b) and electron-donor compounds c).

It is, however, also possible-to use other catalyst systems based on metallocene compounds or, respectively, based on metal complexes which are active in polymerization.

Specifically, conventional Ziegler-Natta catalyst systems comprise a titanium-containing solid component, inter alia halides or alcoholates of tri- or tetravalent titanium, together with a halogen-containing magnesium compound, inorganic oxide backings, such as silica gel, and also electron-donor compounds. These are in particular carboxylic derivatives, ketones, ethers, alcohols or organosilicon compounds.

The titanium-containing solid component may be prepared by methods known per se. Examples of these are described, for example, in EP-A 45 975, EP-A 45 977, EP-A 86 473, EP-A 171 200, GB-A 2 111 066, US-A 4 857 613 and US-A 5 288 824. The process disclosed in DE-A 195 29 240 is preferably used.

Suitable aluminum compounds b) other than trialkylaluminum compounds are those in which one alkyl group has been replaced by an alkoxy group or by a halogen atom, for example by chlorine or bromine. The alkyl groups may be identical or different. Linear or branched alkyl groups are possible. Preference is given to the use of trialkylaluminum compounds each of whose alkyl groups has from 1 to 8 carbon atoms, for example trimethylaluminum, triethylaluminum, triisobutylaluminum, trioctylaluminum or methyldiethylaluminum, or mixtures of these.

Besides the aluminum compounds b), electron-donor compounds c) are generally used as another cocatalyst. Examples of these are mono- or polyfunctional carboxylic acids, carboxylic anhydrides and carboxylic esters, and also ketones, ethers, alcohols, lactones, organophosphorus compounds and organosilicon compounds. These electron-donor compounds c) may be identical with or differ from the electron-donor compounds used to prepare the titanium-containing solid component a).

Other compounds which may be used to prepare polypropylene, instead of Ziegler-Natta catalyst systems, are metallocene compounds or, respectively, metal complexes which are active in polymerization.

For the purpose of the present invention, metallocenes are complex compounds made from metals of transition groups of the Periodic Table with organic ligands, and these together with metallocenium ion-forming compounds give effective catalyst systems. When used to prepare polypropylene the metallocene complexes in the catalyst system are generally in backinged form, backings frequently used are inorganic oxides, but it is also possible to use organic backings in the form of polymers, for example polyolefins. Preference is given to the inorganic oxides described above which are also used to prepare the titanium-containing solid component a).

The central atoms present in the metallocenes usually used are titanium, zirconium or hafnium, preferably zirconium. The central atom usually has bonding via a π-bond to at least one, generally a substituted, cyclopentadienyl group, and also to other substituents. The other substituents may be halogens, hydrogen or organic radicals, preferably fluorine, chlorine, bromine or iodine or a $C_1$–$C_{10}$-alkyl group. The cyclopentadienyl group may also be a constituent of an appropriate heteroaromatic system.

Preferred metallocenes contain central atoms which have bonding via two identical or different π-bonds to two substituted cyclopentadienyl groups, and particular preference is given to those in which there are substituents of the cyclopentadienyl groups bonded to both cyclopentadienyl groups. Particular preference is given to complexes whose substituted or unsubstituted cyclopentadienyl groups also have substitution by cyclic groups on two adjacent carbon atoms, and the cyclic groups may also have been integrated into a heteroaromatic system.

Other preferred metallocenes have only one substituted or unsubstituted cyclopentadienyl group which, however, contains at least one substituent which also has bonding to the central atom.

Examples of particularly suitable metallocene compounds are ethylenebis(indenyl)zirconium dichloride, ethylenebis(tetrahydroindenyl)zirconium dichloride, diphenylmethylene-9-fluorenylcyclopentadienylzirconium dichloride, dimethylsilanediylbis(3-tert-butyl-5-methylcyclopentadienyl)-zirconium dichloride, dimethylsilanediyl(2-methyl-4-azapentalene)(2-methyl-4 (4'-methylphenyl)indenyl)zirconium dichloride dimethylsilanediyl(2-methyl-4-thiapentalene)(2-ethyl-4(4'-tert-butylphenyl)indenyl)zirconium dichloride ethanediyl(2-ethyl-4-azapentalene)(2-ethyl-4(4'-tert-butylphenyl) indenyl)zirconium dichloride dimethylsilanediylbis(2-methyl-4-azapentalene)zirconium dichloride dimethylsilanediylbis(2-methyl-4-thiapentalene)zirconium dichloride dimethylsilanediylbis(2-methylindenyl) zirconium dchloride dimethylsilanediylbis(2-methylbenzindenyl)zirconium dichloride dimethylsilanediylbis(2-methyl-4-phenylindenyl)zirconium dichloride dimethylsilanediylbis(2-methyl-4-naphthylindenyl)zirconium dichloride dimethylsilanediylbis(2-methyl-4-isopropylindenyl)zirconium dichloride or dimethylsilanediylbis(2-methyl-4,6-diisopropylindenyl) zirconium dichloride and also the corresponding dimethylzirconium compounds.

The metallocene compounds are known or obtainable by methods known per se. Other catalysts which may be used are mixtures of metallocene compounds of this type, and also the metallocene complexes described in EP-A 416 815.

The metallocene catalyst systems also comprise metallocenium-ion-forming compounds. Suitable compounds are strong, neutral Lewis acids, ionic compounds with Lewis-acid cations and ionic compounds with Brönsted acids as cation. Examples of these are tris (pentafluorophenyl)borane, tetrakis(pentafluorophenyl) borate or salts of N,N-dimethylaniliniums. Other suitable metallocenium-ion-forming compounds are open-chain or cyclic aluminoxane compounds. These are usually prepared by reacting trialkylaluminum compounds with water and are generally mixtures of linear and cyclic chain molecules of different lengths.

The metallocene catalyst systems may also comprise organometallic compounds of the metals of the 1st, 2nd or 3rd main group of the Periodic Table, for example n-butyllithium, n-butyl-n-octyl-magnesium, triisobutylaluminum, triethylaluminum or trimethylaluminum.

The polypropylenes which can be used for the backing are prepared by polymerization in at least one reaction zone, and also frequently in two or more reaction zones arranged in series (reactor cascade), in the gas phase, in suspension or in the liquid phase (bulk phase). The reactors used may be those usual for polymerizing $C_2$–$C_8$-1-alkenes. Examples of suitable reactors are continuous stirred-tank reactors, loop reactors and fluidized-bed reactors. The size of the reactors is of no significant importance for the process according to the invention and depends on the output to be achieved in each reaction zone.

The reactors used are in particular fluidized-bed reactors, and also horizontally or vertically agitated powder-bed reactors. The reaction bed for the process according to the invention is generally composed of the polymer made from $C_2$–$C_8$-1-alkenes polymerized in the respective reactor.

The polypropylenes used as backing are prepared by polymerization under conventional reaction conditions at from 40 to 120° C., in particular from 50 to 100° C., and at pressures of from 10 to 100 bar, in particular from 20 to 50 bar.

The polypropylenes used as backing generally have a melt flow rate (MFR) to ISO 1133 of from 0.1 to 200 g/10 min, in particular from 0.2 to 100 g/10 min, at 230° C. with a load of 2.16 kg.

The backing used in the novel process may also be a blend, i.e. a mixture of different thermoplastic polymers, for example a blend made from a styrene copolymer with acrylonitrile and from a copolymer made from butadiene and acrylonitrile.

The layered composite material used in the novel process may comprise an intermediate layer of thermoplastic bonding material, preferably made from the thermoplastic used to make the backing. The intermediate layer is in particular a thin film or else a thin web of thickness from 0.001 to 1.0 mm, in particular 0.005 to 0.3 mm. Possible materials for the intermediate layer are in particular paper, polypropylene and polyethylene, styrene polymers, polyoxymethylene or a polybutylene terephthalate.

Another intermediate layer whose use is preferred is a resin-saturated web or fabric, or a resin-saturated film made from a thermoplastic. Resins used for this are in particular acrylate resins, phenolic resins, urea resins or melamine resins. The degree of resinification here may be up to 300%, meaning that practically the entire surface of the intermediate layer has multiple coatings of resin. The degree of resinification is preferably from 50 to 150%, in particular from 70 to 120%. The weight per $m^2$ of the intermediate layer is from 15 to 110 g, in particular from 30 to 60 g.

The layered composite material produced in the novel process may moreover also have a decorative layer arranged upon the intermediate layer, between the intermediate layer and the heat-cured layer.

The decorative material may be composed of a plastic which has an embossment or a coloration, or both combined, and may be a ready-to-use laminate, for example. However, the decorative layer may also be composed of paper or of a fabric or of a paper-like or fabric-like or wood-like or metal-like or leather-like or silk-like material. Examples of these would be decorative layers made from an aluminum-like material or from a stainless-steel-like material, or else from leather-like, silk-like, wood-like, cork-like or linoleum-like material. The decorative layer may also have been resinified with phenolic resins, acrylate resins, urea resins or melamine resins, in which case the degree of resinification may be from 50 to 300%, in particular from 100 to 300%, based on the weight of the decorative layer. The weight of the decorative layer is usually from 10 to 200 $g/m^2$, in particular from 30 to 150 $g/m^2$ and particularly preferably from 60 to 130 $g/m^2$.

The heat-cured layer (overlay) arranged upon the decorative layer is preferably composed of a thermoset plastic, for example of a paper saturated with phenolic resin, with acrylate resin, with melamine resin or with urea resin, crosslinked by exposure to pressure or heat during the production of the layered composite material. The weight of the heat-cured layer (overlay) is usually from 10 to 300 $g/m^2$, in particular from 15 to 150 $g/m^2$ and particularly preferably from 20 to 70 $g/m^2$.

It is also possible to apply to the backing a ready-to-use laminate which is composed of the intermediate layer and/or of the decorative layer and of the overlay. Ready-to-use laminates of this type are known per se and are obtainable, inter alia, from Melaplast in Schweinfurt, Germany.

The total thickness of the layered composite material given a three-dimensional shape in the novel process may be from 1 to 100 mm, preferably from 1 to 20 mm, in particular from 1.5 to 10 mm, and the backing makes up at least 80%, preferably at least 90%, of the total thickness.

It is significant for the novel process that the intermediate layer, the decorative layer, if used, and the heat-cured layer are bonded to the backing by heat treatment in a molding system and are also given a three-dimensional shape prior to or during the heat treatment in the molding system. In the process it is possible for the intermediate layer, the heat-cured layer, and also the decorative layer, if used, to be introduced into the molding system either separately as individual sheets or else together in the form of a ready-to-use laminate. The heat treatment in the molding system preferably takes place at from 150 to 300° C., in particular from 160 to 280° C. and particularly preferably at from 160 to 260° C. Using the novel process in this way it is possible to produce a three-dimensional molding.

In one possible modification of the novel process, the intermediate layer and the heat-cured layer applied to the intermediate layer, and also the decorative layer, if used, may be given a three-dimensional shape in an upstream operation prior to heat treatment in the molding system. One way of doing this is to use a second molding system or, respectively, a mold aided by a heat source, for example a surface-heater or auxiliary tooling, to give the individual layers a three-dimensional shape in advance. This type of three-dimensional shaping in advance (preforming) is usually carried out at at least 150° C., preferably at least 170° C. and in particular at least 180° C. The intermediate layer shaped in advance in this way, the heat-cured layer applied thereto, and also the decorative layer, if used, are then bonded to the backing by heat treatment in another molding system.

Another way is to shape the intermediate layer, the heat-cured layer applied thereto, and also, if used, the decorative layer lying between these two layers, during the thermal treatment in the molding system. In this case the process parameters prevailing in the molding system, such as the temperature and pressure when the molding system is charged with the melt of the thermoplastic polymer, are used to achieve three-dimensional shaping of the individual layers or laps, or else of the ready-to-use laminate.

The processing methods used in the novel process to bond the intermediate layer, the heat-cured layer and also, if used, the decorative layer to the backing are those usual in the plastics industry, for example injection molding or extrusion, or else hot press molding of the individual layers, or a blowing process with heat.

The molding systems used in the novel process may be the devices usual in plastics technology, for example an injection-molding compartment or an injection mold for injection molding, calender rolls or embossing rolls or profile-molding systems for extrusion, or else thermoforming molds for hot press molding or, respectively, split molding systems or split molds for the blowing process with heat.

In injection molding the individual layers, i.e. the intermediate layer, the decorative layer, if used, and the heat-cured layer (or the two latter layers together in the form of a ready-to-use laminate) are either directly given a three-dimensional shape in advance by way of a thermoforming process and then in-mold coated in an injection mold with the thermoplastic polymer which forms the backing, or else jointly given a three-dimensional shape directly only once they are in the injection mold, and are in-mold coated with the thermoplastic polymer. This may be done either on one side or on both sides, and in the latter case the arrangement has the intermediate layer and the heat-cured layer, and also the decorative layer, if used, on both sides of the backing. The thermoplastic polymer of the backing is first heated to at least 150° C., in particular at least 180° C., and then introduced into the injection mold under a pressure of at least 20 N/cm$^2$, preferably at least 30 N/cm$^2$. The injection molding procedure usually takes place at from 150 to 300° C., in particular at from 180 to 280° C. and at pressures of from 20 to 200 N/cm$^2$, in particular from 50 to 100 N/cm$^2$. The temperatures and pressures arising in the injection mold achieve both very good bonding of the intermediate layer and of the decorative layer, if used, to the thermoplastic backing and also further curing of the layered composite material, which then is a three-dimensional molding. The mold is then cooled to 20° C. or above, in particular to 30° C. or above, within a period of from 0.1 to 5 minutes, in particular from 0.3 to 1.2 minutes, while maintaining a holding pressure of at least 10 N/cm, in particular at least 50 N/cm$_2$, and the resultant three-dimensional molding is then removed from the injection mold after trimming.

Heat-shaping processes usual in plastic technology, for example thermoforming, may be used for giving the individual layers a three-dimensional shape in advance. For thermoforming the layers to be given a three-dimensional shape are drawn over a thermoforming mold which has the desired three-dimensional profile, heated by a suitable heat source, such as a surface-heater, to 150–250° C., in particular 160–200° C. After a heating time of from about 0.1 to 2 minutes, in particular from 0.4 to 1.5 minutes, the heat source is removed and the individual layers are then drawn over the thermoforming mold, which is moving upward under a vacuum. In this way the layers are given a three-dimensional shape.

In the extrusion process it is possible for the intermediate layer, the heat-cured layer and also the decorative layer, if used, to be in the form of individual films or else combined in the form of a ready-to-use laminate and to be first given a three-dimensional shape by way of a thermoforming process or by profile extrusion and then to be heated in a profile-molding system to at least 180° C., preferably at least 200° C., and then introduced into a slot die at a pressure of at least 80 N/cm$^2$, preferably at least 90 N/cm$^2$. It is also possible for the intermediate layer, the heat-cured layer and also the decorative layer, if used, to be fed onto one or both sides of the thermoplastic of the backing by way of temperature-controlled calender rolls or embossing rolls (the process known as lamination) and thus bonded to one another. In the novel process the individual layers may also be given their three-dimensional shape within the molding system, i.e. at the calender rolls or embossing rolls. Temperatures from 100 to 250° C., in particular from 150 to 210° C. and pressures are from 20 to 200 N/cm$^2$, in particular from 30 to 120 N/cm$^2$ are usually selected here. The average residence times here are from 0.1 to 10 minutes, in particular from 0.2 to 5 minutes. Very good adhesion of the individual layers to one another is achieved in this way. The resultant three-dimensional molding also has good surface properties. The pressure applied by the calender rolls or embossing rolls is then held at at least 50 N/cm$^2$, in particular at least 70 N/cm$^2$, while the molding system is cooled to 20° C. or above, preferably 30° C. or above, within a period of at least 0.2 minutes, in particular at least 2.0 minutes, and the resultant three-dimensional molding is removed after trimming.

One version of the extrusion process is that known as profile extrusion. In this, the individual layers of the layered composite material, in particular the intermediate layer, are given a three-dimensional shape by a calibrating unit in such a way that these can be fed directly onto the actual profile, i.e. the backing made from a thermoplastic.

It is also possible to carry out the novel process for producing a three-dimensional layered composite material by hot press molding the individual layers. In this case the three-dimensional shape can be given either in advance by way of an upstream thermoforming process or else directly within the press. This is done by feeding pellets of thermoplastic directly onto a laminated composite made from the intermediate layer, the decorative layer, if used, and the heat-cured layer and hot press molding this combination at from 150 to 300° C., in particular from 160 to 250° C., particularly preferably from 180 to 240° C., and at a pressure of from 20 to 200 N/cm², in particular from 40 to 120 N/cm², particularly preferably 50 to 100 N/cm², with press times of from 0.1 to 10 minutes, in particular from 0.2 to 5 minutes and particularly preferably from 0.5 to 2.5 minutes.

It is also possible for the bonding of the intermediate layer, the decorative layer, if used, and the heat-cured layer to the backing, and also the three-dimensional shaping of the resultant layered composite material, to be carried out by a blowing process with heat. For this, the thermoplastic polymer of the backing is first molded by way of an extruder and an annular die to give a tube and then introduced into a split mold into which the intermediate layer, the decorative layer, if used, and the heat-cured layer have previously been inserted, and which is closed at from 50 to 100° C., in particular from 60 to 90° C. Once the split mold has been closed the thermoplastic tube is bonded at from 150 to 300° C., preferably from 150 to 250° C., and in particular from 160 to 200° C. and at a pressure of from 20 to 100 N/cm², in particular from 50 to 80 N/cm², with blowing times of from 0.2 to 5 minutes, in particular from 0.2 to 2.0 minutes and particularly preferably from 0.3 to 1.2 minutes, to the layers which were inserted, and at the same time given a three-dimensional shape. In this process, too, the three-dimensional shaping may take place either prior to or else during the heat treatment in the mold.

The three-dimensional moldings obtained in this way may also have a pigmented surface.

The novel process may, for example, be used to produce a three-dimensional molding in which the individual constituents, i.e. the intermediate layer, the heat-cured layer, the decorative layer, if used, and the backing, have excellent adhesion to one another. The novel process requires less technical resources, gives any desired three-dimensional shape of molding and can be carried out without excessive use of resources in conventional molding systems. The resultant three-dimensional moldings are resistant to chemically, mechanically and thermally induced damage, such as that resulting from damp, chemicals or the heat of a cigarette.

The novel process is particularly suitable for producing three-dimensional moldings which are to have a decorative surface which has particular chemicals resistance, mechanical resistance and heat resistance.

The novel process is used in particular to produce three-dimensional moldings used in furniture, floorcoverings, wall panelling or household equipment, or in the electrical industry, construction industry or automotive industry.

The examples below are intended to describe the invention in further detail. The following test methods were used in the working examples:

behavior on exposure to steam was determined to EN 438-2.24;

abrasion resistance was determined to EN 438-2.6 at 6000 to 10,000 U/min;

compressive strength was determined by the falling ball test to EN 438 with an 8 mm backing plate, size of impression: 5.5 mm;

resistance to the heat of a cigarette was determined to EN 438-2.18;

chemicals resistance was determined to DIN 51958;

scratch resistance was determined to ISO 1518;

bond strength was determined by using a razor blade to make cruciform parallel cuts (crosscuts) into the surface of a molding. An adhesive tape was then pressed onto the cut surface and then vigorously pulled off from the surface at an angle perpendicular to the same. If virtually no segments were removed from the surface with the adhesive tape, the bond strength was graded "+"; if individual segments amounting up to 10% of the total coverage could be pulled away, the result was graded "±" and if more than 10% of the entire surface could be pulled away the result was graded "−". Particularly good bond strengths were graded "++".

EXAMPLE 1

A propylene homopolymer reinforced with 40% by weight of talc and with a melt flow rate (MFR) to ISO 1133 of 15 g/10 min at 230° C. and 2.16 kg was heated to 280° C. and injected at an injection pressure of 100 N/cm² into a shallow injection molding compartment into which had previously been placed, on the ejector side, a ready-to-use laminate which had been given a three-dimensional shape in advance. The advance three-dimensional shaping was carried-out by thermoforming in a pan mold at 180° C., a pressure of 80 N/cm² and an average residence time of 0.5 minutes. The ready-to-use laminate was composed of an intermediate layer made from printed paper and of a heat-cured layer (overlay) made from a polypropylene web resinified with melamine resin and having a weight of about 30 g/m². While maintaining an afterpressure of 50 N/cm², the mold was cooled to 30° C. within a period of 1 minute, then the injection molding compartment was opened and the resultant three-dimensional composite layered material removed. The results of tests of the layered composite material are given in the table below.

EXAMPLE 2

The talc-reinforced propylene homopolymer, the same as used in Example 1, was heated in an extruder to 280° C. and introduced at a pressure of 100 N/cm² into a slot die into which a ready-to-use laminate shaped in advance had previously been fed by way of profile rollers.

The ready-to-use laminate described in Example 1 was used again here. It was given its three-dimensional shape by profile extrusion in a profile molding system at 180° C. and at a pressure of 100 N/cm² with average residence times of 0.2 minutes.

From the slot die the propylene homopolymer together with the ready-to-use laminate with its three-dimensional shape was passed through calendering rolls, where the bonding of the individual layers took place. Maintaining an application pressure of 50 N/cm² from the calendering rolls (molding system), this was cooled to 30° C. within a period of 1 minute, and the resultant three-dimensional layered composite material was then removed after trimming. The results of tests on the resultant layered composite material are given in the table below.

EXAMPLE 3

Pellets of the talc-reinforced propylene homopolymer used in Example 1 were introduced into a heated mold composed of two heated mold halves each of which has a specific three-dimensional profile and which are pressed together with the aid of suitable pressure equipment. The pellets of the propylene homopolymer were applied here to the same ready-to-use laminate as was used in Example 1, with its three-dimensional shape. The hot press molding took place at 190° C. and at a pressure of 50 N/cm², with a press time of 0.5 minute, during which the pellets of the propylene homopolymer were hot press molded with the ready-to-use laminate to give a three-dimensional layered composite material.

Cooling of the press mold gave a three-dimensional layered composite material which gave the test results listed in the table below.

EXAMPLE 4

Example 1 was repeated under the same conditions, with the same ready-to-use laminate and in the same injection-molding chamber, but an unreinforced propylene homopolymer with a melt flow rate (MFR) to ISO 1133 of 15 g/10 min at 230° C. and 2.16 kg was now used instead of the talc-reinforced propylene homopolymer.

The resultant three-dimensional layered composite material had the properties given in the table below.

EXAMPLE 5

Example 2 was repeated under the same conditions, with the same ready-to-use laminate and with the same calendering rolls, but an unreinforced propylene homopolymer with a melt flow rate (MFR) to ISO 1133 of 15 g/10 min at 230° C. and 2.16 kg was now used instead of the talc-reinforced propylene homopolymer.

The resultant three-dimensional layered composite material had the properties given in the table below.

EXAMPLE 6

Example 3 was repeated under the same conditions, with the same ready-to-use laminate and using the same hot press mold, but an unreinforced propylene homopolymer with a melt flow rate (MFR) to ISO 1133 of 15 g/10 min at 230° C. and 2.16 kg was now used instead of the talc-reinforced propylene homopolymer.

The resultant three-dimensional layered composite material had the properties given in the table below.

EXAMPLE 7

Example 1 was repeated under the same conditions, with the same ready-to-use laminate and in the same injection-molding chamber, but a recycled propylene homopolymer with a melt flow rate (MFR) to ISO 1133 of 15 g/10 min at 230° C. and 2.16 kg was now used, reinforced using 30% by weight of talc.

The resultant three-dimensional layered composite material had the properties given in the table below.

EXAMPLE 8

Example 1 was repeated using the same talc-reinforced propylene homopolymer, with the same ready-to-use laminate and in the same injection-molding chamber, but the three-dimensional shaping took place by shaping during, rather than prior to, the heat treatment in the injection-molding chamber, at 190° C. and at a pressure of 80 N/cm², with an average residence time of 0.2 minute.

The resultant three-dimensional layered composite material had the properties given in the table below.

COMPARATIVE EXAMPLE A

Example 1 was repeated using the same talc-reinforced propylene homopolymer, with the same ready-to-use laminate and in the same injection-molding chamber, but no three-dimensional shape was given to the ready-to-use laminate either prior to or during the heat treatment in the injection-molding chamber.

The resultant layered composite material could not be made into a molding since it was incapable of being given a three-dimensional shape.

COMPARATIVE EXAMPLE B

A commercially available worktop composed of a backing in the form of a wooden board and a ready-to-use laminate applied thereupon was tested using a method based on Example 1. The results of these tests are listed in the table below.

EXAMPLE 9

An unreinforced propylene homopolymer with a melt flow rate (MFR) to ISO 1133 of 3.0 g/10 min at 230° C. and 2.16 kg was heated to 260° C. and forced in the form of a tube by way of a blowing mandrel into an open split mold. The split mold, into which a ready-to-use laminate had been inserted, closed once this procedure was complete. The temperature of this mold was 60° C. Once the split mold was closed, the thermoplastic tube was bonded to the ready-to-use laminate at 175° C. and at a pressure of 70 N/cm², with an expansion time of 0.3 minutes. The ready-to-use laminate was composed of an intermediate layer made from polypropylene and of a heat-cured layer (overlay) made from a polypropylene web to which a weight of 40 g/m² of melamine resin had been applied, giving a degree of resinification of 150%. The table below gives the properties of the three-dimensional layered composite material removed after opening the split mold.

|  | Examples | | | | | | | | | Comparative Examples | |
|---|---|---|---|---|---|---|---|---|---|---|---|
|  | 1 | 2 | 3 | 4 | 5 | 6 | 7 | 8 | 9 | A | B |
| Behavior in steam | nc | nc | nc | nc | nc | nc | nc | nc | nc | swells | delaminates |
| Abrasion resistance rpm | >10,000 | >10,000 | >10,000 | >10,000 | >10,000 | >10,000 | >10,000 | >10,000 | >10,000 | >10,000 | >6,000 |
| compressive strength [mm] | <1 | <1 | <1 | <1 | <1 | <1 | <1 | <1 | <1 | <5.5 | <5.5 |
| Cigarette resistance | nc | nc | nc | nc | nc | nc | nc | nc | nc | nc | nc |
| Chemicals resistance | res | res | res | res | res | res | res | res | res | partially delaminates | res |

-continued

|  | Examples | | | | | | | | | Comparative Examples | |
| --- | --- | --- | --- | --- | --- | --- | --- | --- | --- | --- | --- |
|  | 1 | 2 | 3 | 4 | 5 | 6 | 7 | 8 | 9 | A | B |
| Scratch resistance | nc | nc | nc | nc | nc | nc | nc | nc | nc | nc | nc |
| Bond strength | ++ | ++ | ++ | ++ | ++ | ++ | ++ | ++ | ++ | + | + |
| Temperature change from −40° C. to +120° C. | nc | nc | nc | nc | nc | nc | nc | nc | nc | swells | delaminates | nc: no change
res: resistant

It can be seen from the table that the novel process gives three-dimensional layered composite materials which have, inter alia, high resistance to mechanically, chemically and thermally induced stresses. Their three-dimensional structure moreover means that they have a wide variety of uses, for example as moldings in the automotive sector, in the electrical industry or in the furniture sector.

We claim:

1. A process for producing a three-dimensional molding made from a layered composite material comprising a backing of polypropylene containing from 1 to 60 percent by weight of talc as reinforcing filler, an intermediate layer of printed paper arranged thereupon and a heat-cured layer of resinified polypropylene webb, appplied to the intermediate layer, which comprises bonding the intermediate layer and the heat-cured layer applied thereto to the backing by heat treatment in a molding system and also giving these a three-dimensional shape prior to or during the heat treatment in the molding system.

2. A process as claimed in claim 1, wherein, between the intermediate layer and the heat-cured layer, the layered composite material also comprises a decorative layer arranged upon the intermediate layer, and this, together with the intermediate layer and the heat-cured layer, is bonded to the backing by thermal treatment in a molding system and also is given a three-dimensional shape prior to or during the heat treatment in the molding system.

3. A process as claimed in claim 1, wherein the intermediate layer, a decorative layer, if used, and the heat-cured layer applied thereto are given a three-dimensional shape in a preceding operation prior to the heat treatment in the molding system.

4. A process as claimed in claim 1, wherein the intermediate layer, an optional decorative layer, and the heat-cured layer applied thereto are given a three-dimensional shape during the heat treatment in the molding system.

5. The process as claimed in claim 1, wherein injection molding is used to bond the intermediate layer, a decorative layer, if used, and the heat-cured layer to the backing.

6. A process as claimed in claim 5, wherein the polypropylene backing is first heated to at least 150° C. and then introduced into the injection mold of an injection molding machine into which the films for the intermediate layer, the decorative layer, if used, and the heat-cured layer have previously been placed at a pressure of at least 20 N/cm$^2$, followed by in-mold coating of the intermediate layer, the decorative layer, if used, and the heat-cured layer with the thermoplastic polymer at from 150 to 300° C. and at a pressure of from 20 to 200 N/cm$^2$, followed by cooling the mold to 20° C. or above within a period of from 0.1 to 5 minutes while maintaining an afterpressure of at least 10 N/cm$^2$.

7. A process as claimed in claim 1, wherein extrusion is used to bond the intermediate layer, a decorative layer, if used, and the heat-cured layer to the backing.

8. A process as claimed in claim 7, wherein the polypropylene backing is first heated in an extruder to at least 180° C. and then the intermediate layer, the decorative layer, if used, and the heat-cured layer are brought together with this by way of temperature-controlled calendering or embossing rolls and in this way are bonded to one another at from 100 to 250° C. and at a pressure of from 20 to 200 N/cm$^2$.

9. The process as claimed in claims 1, wherein hot press molding is used to bond the intermediate layer, a decorative layer, if used, and the heat-cured layer to the backing.

10. The process as claimed in claim 9, wherein the polypropylene backing is applied directly to a laminated composite made from the intermediate layer, the decorative layer, if used, and the heat-cured layer, and these are press-molded together at from 150 to 300° C. and at a pressure of from 20 to 200 N/cm$^2$ and with a press time of from 0.1 to 10 minutes.

11. A process as claimed in claim 1, wherein a blowing process with heat is used to bond the intermediate layer, a decorative layer, if used, and the heat-cured layer to the backing.

12. A process as claimed in claim 11, wherein the polypropylene backing is first molded by way of an extruder and an annular die to give a tube, and then is introduced into a split mold into which the intermediate layer, the decorative layer, if used, and the heat-cured layer have previously been inserted, and once the split mold has been closed the plasticized tube is expanded by way of a blowing mandrel at from 50 to 100° C., and in this way is then bonded to the inserted layers and at the same time given a three-dimensional shape at from 150 to 300° C. and at a pressure of from 20 to 100 N/cm$^2$, with expansion times of from 0.2 to 5 minutes.

13. The process of claim 1 wherein the molding includes a decorative layer between the intermediate layer and the heat-cured layer.

14. The process of claim 1 wherein the polypropylene backing layer contains from 5 to 50 percent by weight of said talc reinforcing filler.

* * * * *

UNITED STATES PATENT AND TRADEMARK OFFICE
CERTIFICATE OF CORRECTION

PATENT NO. : 6,627,029 B1  Page 1 of 1
DATED : September 30, 2003
INVENTOR(S) : Mueller et al.

It is certified that error appears in the above-identified patent and that said Letters Patent is hereby corrected as shown below:

Column 13,
Line 28, "webb, appplied" should be -- web applied --.

Signed and Sealed this

Sixth Day of January, 2004

JAMES E. ROGAN
*Director of the United States Patent and Trademark Office*